UNITED STATES PATENT OFFICE 2,460,393

VULCANIZATION OF RUBBER

Philip T. Paul, Naugatuck, Conn., assignor to United States Rubber Company, New York, N. Y., a corporation of New Jersey No Drawing. Application June 23, 1945, Serial No. 601,313

14 Claims. (Cl. 260—79.5)

This invention relates to the vulcanization of rubber and similar sulfur-vulcanizable rubber-like materials, by an improved process employing a new accelerator mix.

It is customary in the compounding of rubber to use various organic accelerators containing at least one of the elements, nitrogen or sulfur in chemical combination. Frequently their use has been attended by incipient vulcanization known as burning or scorching.

I have found that primary amine derivatives of certain substituted-aryl sulfenamides which ordinarily alone have no substantial accelerating power, compared to the corresponding secondary amine derivatives, particularly in carbon black stocks, nevertheless act as delayed action activators with nitrogen-containing vulcanization accelerators since they impart to a combination of them and a primary accelerator of vulcanization less activity at low temperatures than at high temperatures.

These delayed action activators subscribe to the general formula Aryl—S—NH—R where "aryl" is a carbocyclic ring of the benzene, naphthalene or biphenyl series having a nuclear carbon directly attached to the sulfur, and which nucleus is further substituted by a group more electronegative than hydrogen (see Remick, "Electronic Interpretations of Organic Chemistry," John Wiley & Sons, New York, pages 26, 30); e. g., halogen, nitro, acyl (—COR), carboxyl (—COOH), carboxy ester (—COOR), sulfonamide (—SO₂NH₂), acyl amide (—CONH₂); and where R is an aliphatic or aromatic hydrocarbon group. Exemplary of the radicals falling in the scope of R are open-chain and closed-chain alkyl and cycloalkyl radicals, and aryl radicals, such as methyl, ethyl, propyl, butyl, amyl, cyclohexyl, allyl, benzyl, b-chloroethyl, b-methoxy ethyl, b-amino ethyl, phenyl, tolyl, xenyl.

Exemplary of preferred sulfenamides are:

N-methyl o-nitrophenyl sulfenamide
N-ethyl o-nitrophenyl sulfenamide
N-ethyl m-nitrophenyl sulfenamide
N-ethyl p-nitrophenyl sulfenamide
N-ethyl 2,5-di-chlorophenyl sulfenamide
N-methallyl o-nitrophenyl sulfenamide
N-phenyl o-nitrophenyl sulfenamide
N-p-tolyl o-nitrophenyl sulfenamide.

Among the useful nitrogen-containing accelerators, employable with any of the above sulfenamides, are the following:

Acetaldehyde-aniline condensation products
Acetaldehyde-butyraldehyde-aniline product
Acetaldehyde-formaldehyde-aniline product
Acetaldehyde-p-toluidine-aniline product
Alpha-ethyl beta-propyl acrolein-aniline product
Tributylidene aniline
Butyraldehyde-monobutylamine product
Formaldehyde-aniline product
Formaldehyde-monoethyl amine product
Formaldehyde-para toluidine product
Diphenylguanidine
Di ortho tolylguanidine
Triphenylguanidine
2-mercapto thiazole
4,5-dimethyl 2-mercapto thiazole
4-ethyl 2-mercapto thiazole
2-mercapto benzothiazole
2,2'-benzothiazole disulfide
Zinc 2-benzothiazole sulfide
Dinitrophenyl 2-benzothiazole sulfide
Phenyl amino methyl 2-benzothiazole sulfide
Bis-N,N'-(2-benzothiazyl thiomethyl) urea
Benzoyl 2-benzothiazyl sulfide
Benzothiazyl 2-monocyclohexyl sulfenamide
2-mercapto thiazoline
2-mercapto 4-methyl thiazoline
Tetramethyl thiuram monosulfide
Tetramethyl thiuram disulfide
Zinc dimethyl thiocarbamate
Tetra ethyl thiuram disulfide
Lead dimethyl dithiocarbamate.

The preferred activators subscribe to the formula

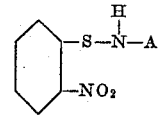

where A is a saturated or unsaturated aliphatic radical or an aromatic radical of the benzene or analogous series, which may be further substituted or not. These chemicals are broadly primary amine derivatives of o-nitro thiophenol. The primary amine may be either a mono-amine or a diamine.

In the case of a primary diamine, either one or both of the amino (NH₂) groups may be substituted by the o-nitro phenyl sulfide radical. To illustrate, with ethylene diamine or polyethylene diamine

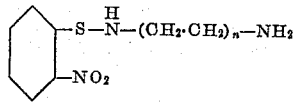

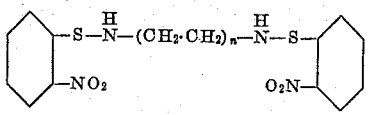

where $n$ is one or a multiple of one. The chemicals may also be described as o-nitro thiophenols in which the mercapto hydrogen atom is replaced by an amino radical in which the trivalent-amino-nitrogen atom is linked to hydrogen and also to a hydrocarbon group.

The use of the materials denoted as delayed action activators for the primary vulcanization accelerators, in addition to imparting a more favorable scorch factor, also allows greater freedom of compounding variation. By varying the ratios of accelerator and activator it is possible to obtain a series of combinations which vary in scorch and curing properties. Indeed, in some cases it may be found desirable to use a preponderance of the activator so as to have a rubber stock that is extremely safe and yet not too highly cured. Consequently, the ratio of activator to accelerator is to be chosen, dependent on the type of rubber (natural or synthetic), type of stock (white stock, tread stock, etc.), temperature of cure, time of cure, the particular primary accelerator, for example, in the case of mercapto benzothiazole, the proportion of activator generally ranges from 25 to 200%, by weight, based on the weight of the mercapto benzothiazole, and lastly the objectives of the compounder, i. e., whether he desires to provide a low or high modulus stock, to provide for a short or a long cure, etc.

The preparation of these activators generally involves the reaction of an aryl sulfur chloride and a primary aliphatic or aromatic amine, such as is described by Billman and O'Mahony, Journal of the American Chemical Society 61, 2340 (1939).

The following examples, in which the parts are by weight, are given to illustrate the invention:

EXAMPLE 1

*Master batch A*

| | |
|---|---|
| Smoked sheet | 100 |
| Carbon black | 45 |
| Zinc soap of coconut oil acids | 3.5 |
| Pine tar | 3.5 |
| Zinc oxide | 5.0 |
| Sulfur | 3.0 |
| Acetone-diphenylamine condensate (antioxidant) | 1.0 |
| | 161.0 |

| | A | B | C | D |
|---|---|---|---|---|
| Master Batch A | 161.0 | 161.0 | 161.0 | 161.0 |
| Mercaptobenzothiazole | 1.0 | 0.5 | 1.0 | 0.65 |
| N-Cyclohexyl o-nitrophenyl sulfenamide | | 0.35 | | |
| N-Phenyl o-nitrophenyl sulfenamide | | | | 0.54 |

[Cured 45 and 60 minutes at 30 pounds per square inch steam pressure]

| Minutes of Cure | Per Cent Elongation | A | B | C | D |
|---|---|---|---|---|---|
| 45 | 300 | 820 | 930 | 875 | 900 |
| | 500 | 2,175 | 2,400 | 2,100 | 2,100 |
| | Break | 3,500–670 | 3,640–653 | 3,090–656 | 3,180–683 |
| 60 | 300 | 950 | 1,200 | 1,040 | 1,090 |
| | 500 | 2,440 | 2,870 | 2,390 | 2,440 |
| | Break | 3,480–623 | 3,890–623 | 3,230–653 | 3,330–656 |

[Scorch tests 75 minutes at 5 pounds per square inch steam pressure]

| A | | B | | C | | D | |
|---|---|---|---|---|---|---|---|
| T | E | T | E | T | E | T | E |
| 192 | 832 | 122 | 842 | 559 | 726 | 330 | 820 |

T means tensile strength in pounds per square inch.
E means per cent elongation.

Stocks A and B, and stocks C and D should be compared. Stocks A and C, although apparently the same, were compounded at different times. The differences in modulus and tensile of stocks A and C are explained as due to the prolonged ageing of the broken down master batch of rubber and carbon black.

EXAMPLE 2

*Master batch B*

| | |
|---|---|
| Smoked sheet | 100 |
| Carbon black | 45 |
| Zinc soap coconut oil acids | 3.5 |
| Pine tar | 3.5 |
| Zinc oxide | 5.0 |
| Sulfur | 3.0 |
| | 160.0 |

| | E | F | G | H | I |
|---|---|---|---|---|---|
| Master Batch B | 160 | 160 | 160 | 160 | 160 |
| Mercaptobenzothiazole | 1.0 | 0.5 | 0.5 | | |
| N-Methyl o-nitrophenyl sulfenamide | | 0.35 | | | |
| N-Ethyl o-nitrophenyl sulfenamide | | | 0.35 | | |
| 2,2'-Benzothiazyl disulfide | | | | 1.0 | 0.5 |
| N-Isopropyl o-nitrophenyl sulfenamide | | | | | 0.35 |

[Cured 45 and 60 minutes at 30 pounds per square inch steam pressure]

| Minutes of Cure | Per Cent Elongation | E | F | G | H | I |
|---|---|---|---|---|---|---|
| 45 | 300 | 1,200 | 980 | 800 | 800 | 800 |
| | 500 | 2,590 | 2,180 | 2,290 | 2,250 | 2,170 |
| | Break | 3,290–623 | 3,100–636 | 3,090–613 | 2,970–615 | 3,050–630 |
| 60 | 300 | 1,310 | 1,190 | 1,150 | 910 | 1,010 |
| | 500 | 2,840 | 2,700 | 2,410 | 2,480 | 2,500 |
| | Break | 3,200–573 | 3,220–593 | 3,220–633 | 2,990–553 | 3,200–600 |

[Scorch tests 75 minutes at 5 pounds per square inch steam pressure]

| E | | F | | G | | H | | I | |
|---|---|---|---|---|---|---|---|---|---|
| T | E | T | E | T | E | T | E | T | E |
| 880 | 693 | 146 | 856 | 200 | 740 | 136 | 81 | 90 | 800 |

EXAMPLE 3

*Master batch C*

| | |
|---|---|
| GR–S (butadiene-styrene elastomer) | 100 |
| Coal tar type softener | 3.0 |
| Sulfur | 2.0 |
| Carbon black | 50.0 |
| Zinc oxide | 5.0 |
| | 160.0 |

|  | J | K |
|---|---|---|
| Master Batch C | 160.0 | 160.0 |
| Mercaptobenzothiazole | 1.5 | 0.75 |
| N-methyl o-nitrophenyl sulfenamide | | 0.65 |

[Cured 30 and 45 minutes at 30 pounds per square inch steam pressure]

| Minutes of Cure | Per Cent Elongation | J | K |
|---|---|---|---|
| 30 | 300 | 410 | 720 |
|  | 500 | 1,300 | 1,800 |
|  | Break | 2,400-705 | 2,600-606 |
| 45 | 300 | 790 | 1,230 |
|  | 500 | 2,100 | |
|  | Break | 2,500-540 | 2,570-463 |

[Scorch tests 75 minutes at 5 pounds per square inch steam pressure]

| J | | K | |
|---|---|---|---|
| T | E | T | E |
| 260 | 916 | 43 | 876 |

EXAMPLE 4

|  | L | M |
|---|---|---|
| Master Batch A | 161.0 | 161.0 |
| Tetramethyl thiuram monosulfide | 0.2 | 0.15 |
| N-Cyclohexyl o-nitrophenyl sulfenamide | | 0.2 |

[Cured 45 and 60 minutes at 30 pounds per square inch steam pressure]

| Minutes of Cure | Per Cent Elongation | L | M |
|---|---|---|---|
| 30 | 300 | 910 | 1,110 |
|  | 500 | 2,110 | 2,300 |
|  | Break | 2,580-583 | 2,970-596 |
| 45 | 300 | 1,000 | 1,320 |
|  | 500 | 2,180 | 2,600 |
|  | Break | 2,400-530 | 3,280-593 |

[Scorch tests 70 minutes at 10 pounds per square inch steam pressure]

| L | | M | |
|---|---|---|---|
| T | E | T | E |
| 1,270 | 690 | 563 | 806 |

EXAMPLE 5

Master batch D

| | |
|---|---|
| Pale crepe | 100 |
| Zinc oxide | 10 |
| Whiting | 60 |
| Lithopone | 60 |
| Zinc soap coconut oil acids | 0.5 |
| Sulfur | 3.0 |
| | 233.5 |

|  | N | O |
|---|---|---|
| Master Batch D  | 233.5 | 233.5 |
| Butyraldehyde-aniline condensate | 0.5 | 0.5 |
| Cyclohexyl o-nitrophenyl sulfenamide | | 0.35 |

[Cured 15 and 30 minutes at 30 pounds per square inch steam pressure]

| Minutes of Cure | Per Cent Elongation | N | O |
|---|---|---|---|
| 15 | 300 | 310 | 300 |
|  | 500 | 1,020 | 1,220 |
|  | Break | 2,200-686 | 2,400-645 |
| 30 | 300 | 390 | 500 |
|  | 500 | 1,290 | 1,500 |
|  | Break | 2,400-645 | 2,590-620 |

[Scorch tests 20 minutes at 5 pounds per square inch steam pressure]

| N | | O | |
|---|---|---|---|
| T | E | T | E |
| 186 | 1,116 | 150 | 1,020 |

It is to be understood that the term "a rubber" is employed in the claims in a generic sense to refer to natural as well as synthetic rubbers which are capable of vulcanization when heated with sulfur, and includes caoutchouc, balata, gutta percha, polybutadienes, and modified polybutadienes, such as GRS and GRN (respectively, butadiene-styrene copolymer rubber, and butadiene-acrylonitrile copolymer rubber), as well as latices and reclaims of such materials, whether or not admixed with pigments, fillers, softeners, antioxidants, etc.

Other ratios of the compounding ingredients than those mentioned in the examples given, as well as other well-known fillers, pigments, etc., may be employed in the production of various types of rubber compounds, and are apparent to those skilled in the art to which the invention pertains.

Having thus described my invention, what I claim and desire to protect by Letters Patent is:

1. A method of vulcanizing a sulfur-vulcanizable rubber which comprises incorporating therein sulfur, a small amount of a primary organic rubber-vulcanization accelerator, and an activator having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a member selected from the group consisting of aliphatic and aromatic hydrocarbon groups.

2. A sulfur-vulcanizable rubber composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a member selected from the group consisting of aliphatic and aromatic hydrocarbon groups.

3. A method of vulcanizing a sulfur-vulcanizable rubber which comprises incorporating therein sulfur, a small amount of a primary organic rubber-vulcanization accelerator, and an activator having the general formula Aryl—S—NH—R where aryl represents a carbocyclic ring having a nuclear carbon atom directly bonded to the S, and which nucleus is further substituted by a nitro group, and R is a member selected from the group consisting of aliphatic and aromatic hydrocarbon groups.

4. A sulfur-vulcanizable rubber composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further susbtituted by a nitro group, and R is a member selected from the group consisting of aliphatic and aromatic hydrocarbon groups.

5. A method of vulcanizing a sulfur-vulcanizable rubber which comprises incorporating therein sulfur, a small amount of a primary organic rubber-vulcanization accelerator, and an activator having the general formula Aryl—S—NH—R where aryl represents a benzene ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a member selected from the group consisting of aliphatic and aromatic hydrocarbon groups.

6. A sulfur-vulcanizable rubber composition containing sulfur, a small amount of a primary organic rubber-vulcanization accelerator, and a compound having the general formula Aryl—S—NH—R where aryl represents a benzene ring having a nuclear carbon atom directly bonded to the S, and which nucleus is further substituted by a nitro group, and R is a member selected from the group consisting of aliphatic and aromatic hydrocarbon groups.

7. A sulfur-vulcanizable rubbery butadiene-styrene copolymer composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a member selected from the group consisting of aliphatic and aromatic hydrocarbon groups.

8. A sulfur-vulcanizable rubbery butadiene-styrene copolymer composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a nitro group, and R is a member selected from the group consisting of aliphatic and aromatic hydrocarbon groups.

9. A method of vulcanizing a sulfur-vulcanizable rubber which comprises incorporating therein sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is an isopropyl radical.

10. A method of vulcanizing a sulfur-vulcanizable rubber which comprises incorporating therein sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a cyclohexyl radical.

11. A sulfur-vulcanizable rubber composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is an isopropyl radical.

12. A sulfur-vulcanizable rubber composition containing sulfur, a small amount of a primary organic rubber-vulcanization accelerator, and a compound having the general formula Aryl—S—NH—R where aryl represents a carbocyclic ring having a nuclear carbon atom directly bonded to the S, and which nucleus is further substituted by a group more electro-negative than hydrogen selected from the class consisting of halogen, nitro, acyl, carboxyl, carboxy ester, sulfonamide, and acylamide, and R is a cyclohexyl radical.

13. A method of vulcanizing a sulfur-vulcanizable rubber which comprises incorporating therein sulfur, a small amount of a primary organic rubber-vulcanization accelerator, and a compound having the formula

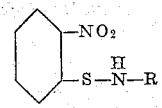

where R is an isopropyl radical.

14. A method of vulcanizing a sulfur-vulcanizable rubber which comprises incorporating therein sulfur, a small amount of a primary organic rubber-vulcanization accelerator, and a compound having the formula

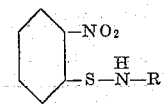

where R is a cyclohexyl radical.

PHILIP T. PAUL.

REFERENCES CITED

The following references are of record in the file of this patent:

UNITED STATES PATENTS

| Number | Name | Date |
|---|---|---|
| 2,333,468 | Cooper | Nov. 2, 1943 |
| 2,382,813 | Paul | Aug. 14, 1945 |